(12) United States Patent
Porte

(10) Patent No.: US 7,334,393 B2
(45) Date of Patent: Feb. 26, 2008

(54) AIRCRAFT ENGINE IN WHICH THERE IS A SMALL CLEARANCE SEPARATING THE FAN COWLS AND THE THRUST INVERTER COWLS

(75) Inventor: Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 745 days.

(21) Appl. No.: 10/821,854

(22) Filed: Apr. 12, 2004

(65) Prior Publication Data

US 2004/0255572 A1 Dec. 23, 2004

(30) Foreign Application Priority Data

Jun. 18, 2003 (FR) .................................. 03 50231

(51) Int. Cl.
*F02K 3/02* (2006.01)

(52) U.S. Cl. ........................................ 60/226.1; 224/54

(58) Field of Classification Search .............. 60/226.1, 60/796; 244/54, 53 R; 248/554
See application file for complete search history.

(56) References Cited

U.S. PATENT DOCUMENTS

| | | | | |
|---|---|---|---|---|
| 4,044,973 A | * | 8/1977 | Moorehead | 244/54 |
| 4,150,802 A | * | 4/1979 | Evelyn et al. | 244/54 |
| 4,425,080 A | * | 1/1984 | Stanton et al. | 415/197 |
| 4,603,821 A | * | 8/1986 | White | 244/54 |
| 4,683,717 A | * | 8/1987 | Naud | 60/226.1 |
| 4,940,196 A | * | 7/1990 | Lardellier | 244/54 |
| 5,058,379 A | * | 10/1991 | Lardellier | 60/226.1 |
| 5,136,839 A | * | 8/1992 | Armstrong | 60/226.1 |
| 5,157,915 A | * | 10/1992 | Bart | 60/797 |
| 5,174,525 A | * | 12/1992 | Schilling | 244/54 |
| 5,205,513 A | * | 4/1993 | Schilling | 244/54 |
| 5,524,847 A | * | 6/1996 | Brodell et al. | 244/54 |
| 5,603,471 A | | 2/1997 | Armstrong | |
| 5,642,615 A | * | 7/1997 | Porte et al. | 60/226.1 |
| 5,755,403 A | | 5/1998 | Marche | |
| 6,123,170 A | * | 9/2000 | Porte et al. | 181/214 |
| 6,241,189 B1 | * | 6/2001 | Porte | 244/134 B |
| 6,334,588 B1 | * | 1/2002 | Porte | 244/129.4 |
| 6,334,730 B1 | * | 1/2002 | Porte | 403/104 |
| 6,340,135 B1 | | 1/2002 | Barton | |
| 6,398,161 B1 | * | 6/2002 | Jule et al. | 244/54 |
| 6,443,395 B1 | * | 9/2002 | Porte et al. | 244/134 R |
| 6,857,669 B2 | * | 2/2005 | Porte et al. | 285/368 |
| 2002/0027180 A1 | * | 3/2002 | Porte et al. | 244/134 R |
| 2002/0148929 A1 | * | 10/2002 | Andre et al. | 244/134 R |

FOREIGN PATENT DOCUMENTS

| | | |
|---|---|---|
| EP | 0 744 339 | 11/1996 |
| EP | 0 898 063 | 2/1999 |
| WO | WO 99/30969 | 6/1999 |

* cited by examiner

*Primary Examiner*—William H. Rodriguez
(74) *Attorney, Agent, or Firm*—Oblon, Spivak, McClelland, Maier & Neustadt, P.C.

(57) ABSTRACT

Aircraft engine comprising a pod comprising, in sequence from front to back, an air inlet structure (6), fan cowls (7), thrust inverter cowls (8), and a nozzle (9), additional stiffening means are placed either in the air inlet structure (6) or between the fan cowls (7) and the thrust inverter cowls (8). This arrangement limits the clearance between fan cowls (7) and thrust inverter cowls (8), despite the pressure differences applied in flight on the air inlet structure (6), due to the aerodynamic air flow. This avoids the formation of an excessive parasite drag that would increase engine fuel consumption.

18 Claims, 2 Drawing Sheets

AIRCRAFT ENGINE IN WHICH THERE IS A SMALL CLEARANCE SEPARATING THE FAN COWLS AND THE THRUST INVERTER COWLS

TECHNICAL DOMAIN

The invention relates to an aircraft engine with a pod comprising, in sequence along the air flow direction, an air inlet structure, fan cowls and thrust inverter cowls.

The aircraft engine according to the invention may be installed on any type of aircraft and particularly on commercial aircraft assigned to transport of passengers or goods.

Throughout the remainder of text, terms such as "front", "back", etc. refer to the direction of the air flow within the engine. Similarly, the term "axial" refers to a direction parallel to the engine axis.

STATE OF PRIOR ART

As shown diagrammatically in the exploded perspective view in FIG. 1 of the attached drawings, a conventional aircraft engine such as a turbojet typically comprises an engine casing 1, suspended from an aircraft wing 2 by a pylon 3 and surrounded by a pod, so as to delimit an annular duct between them, inside which a fan 4 is placed. Around the fan 4, the fan duct is delimited by a fan casing 5, fixed to the engine casing 1 by ribs (not shown).

In the air flow direction, in other words from the front towards the back, the pod includes (in sequence) an annular air inlet structure 6, a pair of right and left fan cowls 7, a pair of right and left thrust inverter cowls 8 and an annular nozzle 9. The fan cowls 7 are articulated on the pylon 3 at their upper edges and can be opened to enable maintenance. In flight, the fan cowls 7 are held closed by locking devices inserted between their lower edges.

The back inner edge of the air inlet structure 6 is fixed directly onto the front edge of the fan casing 5 by bolt or rivet type devices (not shown).

The front edge of each of the thrust inverter cowls 8 is also fixed to the back edge of the fan casing 5. When the thrust inverter cowls 8 are installed, this function is performed by insertion of a circular stud (not shown) fixed to each of the thrust inverter cowls 8 in a groove (not shown) machined on the fan casing 5. When the thrust inverters installed in the cowls 8 are used, this arrangement transmits all axial forces generated by the engine reverse thrust to the fan casing 5.

When the fan cowls 7 are closed, they are fixed to the air inlet structure 6. This function is normally performed by blades (not shown) installed inside the front edge of each of the fan cowls 7, which fit without clearance into the orifices (not shown) provided at the back end of the air inlet structure 6. The number of blades and orifices depends on the engine size. As a variant, the blades are sometimes replaced by a single stud formed on at least part of the circumference of the fan cowls 7 and that fits into a circumferential groove provided on the air inlet structure.

Taking account of the fabrication and assembly tolerances of the different parts, there is a small clearance J1 between the back edges of the fan cowls 7 and the front edges of the thrust inverter cowls, and a small clearance J2 between the back edge of the air inlet structure 6 and the front edges of the fan cowls 7, at the external surface of the pod, when the fan cowls are closed. These clearances are kept to a minimum to avoid excessive parasite drag that would increase engine fuel consumption.

When the aircraft is in flight, the air inlet structure 6 is affected by pressure differences caused by the aerodynamic air flow. These pressure differences have the effect of submitting the air inlet structure to a suction phenomenon that tends to pull it forwards with respect to the other components of the engine.

Considering that the air inlet structure 6 and the fan cowls 7 are fixed by blade-orifice or a similar type of structure, the assembly formed by the air inlet structure and the fan cowls starts bending and tends to be pulled forwards, therefore the clearance J2 between these parts remains constant and limited. On the other hand, the clearance J1 between the fan cowls 7 and the thrust inverter cowls 8 is increased by this bending, since there is no connection between these cowls. This increases the parasite drag and contributes to increasing fuel consumption throughout the flight.

Furthermore, relative movements generated by the suction phenomenon cause accelerated part wear.

DESCRIPTION OF THE INVENTION

The purpose of the invention is an aircraft engine with an innovative design that at least partly solves the problems that arise on existing engines.

More precisely, the purpose of the invention is an aircraft engine in which the clearance between the fan cowls and the thrust inverter cowls remains small even when the aircraft is in flight, so as to limit parasite drag and to not increase fuel consumption.

According to the invention, this result is achieved using an aircraft engine comprising a fan casing and a pod comprising, in sequence along the air flow direction, an air inlet structure fixed to the fan casing, at least one fan cowl that can be in an open position and in a closed position and at least one thrust inverter cowl fixed to the fan casing, a front edge of the fan cowl being attached to a back edge of the air inlet structure using axial force transmission means when in the said closed-position, characterised in that additional stiffening means are placed in the air inlet structure or between the fan cowl and the thrust inverter cowl.

The introduction of additional stiffening means in the pod structure provides a means of eliminating or very strongly limiting deformations of the assembly formed by the air inlet structure and fan cowls caused by the above mentioned suction phenomenon when the aircraft is in flight. Therefore the clearance J1 between the fan cowls and the thrust inverter cowls remains small, despite the lack of any connection between these parts. Thus, fuel consumption is not increased by an increase in the parasite drag.

According to a first embodiment of the invention, the additional stiffening means comprise several rigid stiffeners, of which one first end is fixed to the air inlet structure close to the axial force transmission means, and a second end is fixed to the air inlet structure close to the location at which the structure is fixed to the fan casing. Thus, the air inlet structure is reinforced to oppose the suction force that tends to pull this structure forwards.

According to a second embodiment of the invention, the additional stiffening means comprise complementary elements formed on a front edge of the thrust inverter cowl and on a back edge of the fan cowl respectively, the said complementary elements being designed to be inserted one into the other, with a small predetermined axial clearance in the closed position of the fan cowl, to enable transmission of axial forces after compensation of the said clearance. After compensation of the existing clearance between the said complementary elements, this arrangement provides a rigid link between the fan cowls and the thrust inverter cowls to take account of manufacturing tolerances, the said rigid link opposing the suction force that tends to draw the air inlet structure forwards.

In the second embodiment of the invention, the complementary elements advantageously comprise several orifices formed on the front edge of the thrust inverter cowl and several studs formed on the back edge of the fan cowl, so as to penetrate into the said orifices when the fan cowl is in the closed position, the orifices and the studs being distributed around the periphery of the engine.

In the second embodiment of the invention, the complementary elements may also include a circumferential groove formed on the front edge of the thrust inverter cowl and a stud formed on at least part of the circumference of the back edge of the fan cowl, so as to penetrate into the said circumferential groove when the fan cowl is in the closed position.

BRIEF DESCRIPTION OF THE DRAWINGS

We will now describe different preferred embodiments of the invention as non-limitative examples, with reference to the attached drawings, among which.

DETAILED PRESENTATION OF PREFERRED EMBODIMENTS

Figure 1:
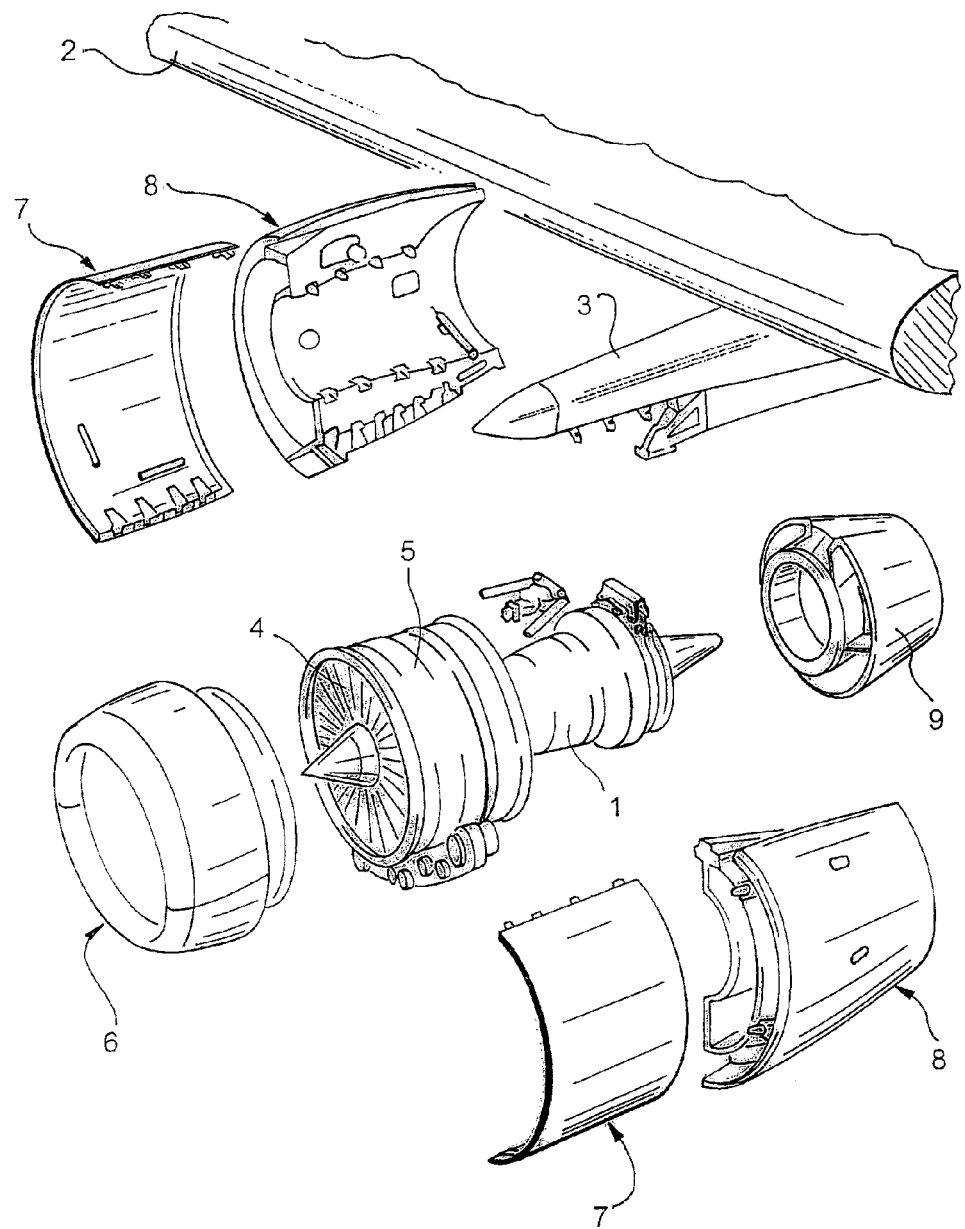
FIG. 1, already described, is an exploded perspective view that represents an aircraft engine according to prior art.

The engine according to the invention is similar to the engine that has been described above with reference to FIG. 1. Therefore refer to the description made with reference to FIG. 1 to determine the main component elements of the engine and their relative layout.

Essentially, it is important to remember that the engine comprises a central part delimited on the outside by an engine casing 1 and a pod surrounding the engine casing. The central part of the engine is separated from the pod by a fan duct in which a fan 4 is located. A fan casing 5 surrounds the fan and is rigidly fixed to the engine casing 1. From the front to the back, the pod comprises an air inlet structure 6 fixed to the front end of the fan casing 5, two fan cowls 7 hinged onto the pylon 3 and surrounding the fan casing 5, two thrust inverter cowls 8 fixed to the back end of the fan casing 5 and an annular nozzle 9.

To enable maintenance, the fan cowls 7 may be tilted upwards into an open position. When the aircraft is operational, the fan cowls 7 are closed and their lower edges are connected to each other by locking means.

Figure 2:
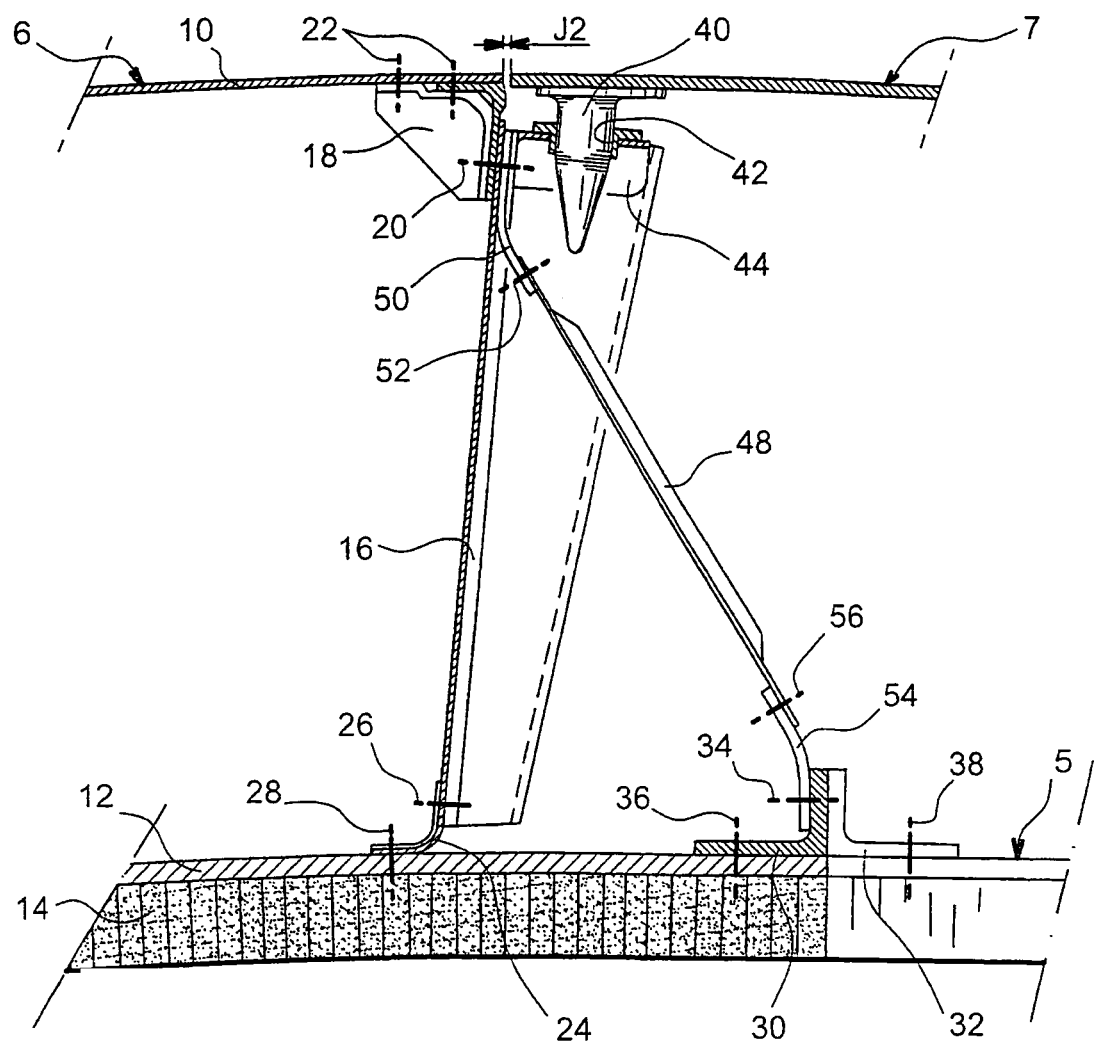
FIG. 2 is a larger scale sectional view of the junction area between the air inlet structure and one of the fan cowls of the pod of an aircraft engine, according to a first embodiment of the invention.

As shown in more detail in FIG. 2, the air inlet structure 6 comprises an outer enclosure 10, an inner enclosure 12 provided with a noise reducing structure 14 and stiffeners 16 connecting enclosures 10 and 12 to each other, at the back end of the outer enclosure 10.

More precisely, a first end of each of the stiffeners 16 is fixed to the outer enclosure 10 by a bracket 18 and attachment devices such as rivets or bolts diagrammatically shown by chained dotted lines 20 and 22.

The second end of each of the stiffeners 16 is fixed to the inner enclosure 12 by a bracket 24 and attachment devices such as rivets or bolts shown diagrammatically by chained dotted lines 26 and 28.

The stiffeners 16 are arranged such that their ends are located in the same plane approximately perpendicular to the longitudinal axis of the engine.

As also shown in FIG. 2, the inner enclosure 12 of the air inlet structure 6, fitted with its anti-noise structure 14, projects backwards beyond the stiffeners 16. The back end of the said inner enclosure 12 is fixed to the front end of the fan casing 5, for example by brackets 30 and 32 and attachment devices such as rivets or bolts diagrammatically shown by the chained dotted lines 34, 36 and 38.

As shown more precisely in FIG. 2, when they are in their closed position, the fan cowls 7 are fixed to the air inlet structure 6 for example by blades 40 that fit into the orifices 42 provided at the back end of the air inlet structure 6, without any clearance. The orifices 42 are formed in the parts 44 that are fixed on the back edge of the air inlet structure 6, close to its external enclosure. This attachment may in particular be made by attachment means 20 used to fix the stiffeners 16 on the brackets 18.

According to one variant embodiment not shown and according to a known arrangement, the fan cowls 7 can also befixed to the air inlet structure 6 by providing a circumferential groove on the back edge of the air inlet structure 6 close to the external enclosure of this structure, and a stud on the front edge of each of the fan cowls 7, at least around part of their circumference. When the fan cowls are closed, the stud penetrates into the circumferential groove with no clearance, so as to fix the said cowls 7 of the air inlet structure 6.

The fan cowls bear on the front parts 46 of the thrust inverter cowls 8 at their back end (see FIG. 3) when the said fan cowls are closed.

According to the known arrangement that has just been described, and that can be subjected to a number of variants without going outside the scope of the invention, there is a clearance J1 between the adjacent edges on the fan cowls 7 and the thrust inverter cowls 8 and a clearance J2 between the adjacent edges of the air inlet structure 6 and fan cowls 7, at the external periphery of the pod. These clearances J1 and J2, which originate from fabrication and assembly tolerances, are limited to very small values to prevent the formation of a parasite drag that will increase fuel consumption.

In this conventional arrangement, the outer part of the air inlet structure 6 deforms forwards, under the effect of pressure differences caused by aerodynamic flow when the aircraft is in flight. Under the effect of this deformation, the fan cowls 7 are pulled forwards by the clearance-free link made by the blades 40 and the orifices 42. Therefore, the clearance J2 remains constant and very small. On the other hand, the clearance J1 increases, which has the effect of increasing aerodynamic drag and consequently fuel consumption on existing engines.

According to the invention, the additional stiffening means are integrated into the pod, so as to very significantly increase the stiffness of the assembly formed by the air inlet structure 6 and the fan cowls 7.

In the embodiment shown in FIG. 2, these additional stiffening means include several rigid stiffeners, one of which is shown as 48 in FIG. 2. Each rigid stiffener is in the form of an approximately straight bar 48, located in a plane passing through the longitudinal axis of the engine.

A first end of each of the bars 48 is fixed to the air inlet structure 6, close to the axial force transmission means between the said air inlet structure- and the fan cowls 7, in this case materialised by the blades 40 and the orifices 42. This attachment is achieved by brackets 50 and attachment means such as rivets or bolts, symbolically shown by chained dotted lines 20 and 52 in FIG. 2, where the bracket is fixed on the stiffener 16 by attachment means 20 also used for attachment of the bracket 18 and the part 44.

As a variant, when the stiffeners 16 are large, the first end of each of the rigid stiffeners 48 can also be fixed approximately at the mid-point along the length of the stiffeners 16. This arrangement limits vibrations of stiffeners in flight, and consequently wear of the elements present.

The second end of each of the rigid stiffeners 48 is fixed to the air inlet structure 6, close to the location at which the structure is fixed to the fan casing 5. This attachment is provided by another bracket 54 and by attachment means such as rivets or bolts, shown symbolically by chained dotted lines 34 and 56 in FIG. 2 where the bracket 54 is fixed to the brackets 30 and 32 by attachment means connecting them to each other.

According to this arrangement, the second end of each of the rigid stiffeners 48 is offset backwards and inwards towards the engine from its first end. Furthermore, the rigid stiffeners 48 connect the back of the peripheral external part of the air inlet structure 6 to the back of the inner peripheral part of the said structure, in its attachment area onto the fan casing 5, in other words on a rigid part of the engine. Thus, the rigid stiffeners 48 resist the forces that tend to move the external peripheral part of the air inlet structure 6 forwards with respect to the rest of the engine when the aircraft is in flight.

By opposing the forwards displacement of the external peripheral part of the air inlet structure 6, the rigid stiffeners 48 practically eliminate all relative movement between the fan cowls 7 and thrust inverter cowls 8, since the fan cowls 7 are fixed to the air inlet structure by axial force transmission means materialised by the blades 40 and the orifices 42. This prevents an increase in the clearance J1 between the fan cowls 7 and the thrust inverter cowls 8. Consequently, the fuel consumption of the engine can be kept equal to a minimum value.

The number of rigid stiffeners 48 depends on the forces to be resisted. The rigid stiffeners 48 are distributed uniformly around the entire periphery of the pod.

Figure 3:
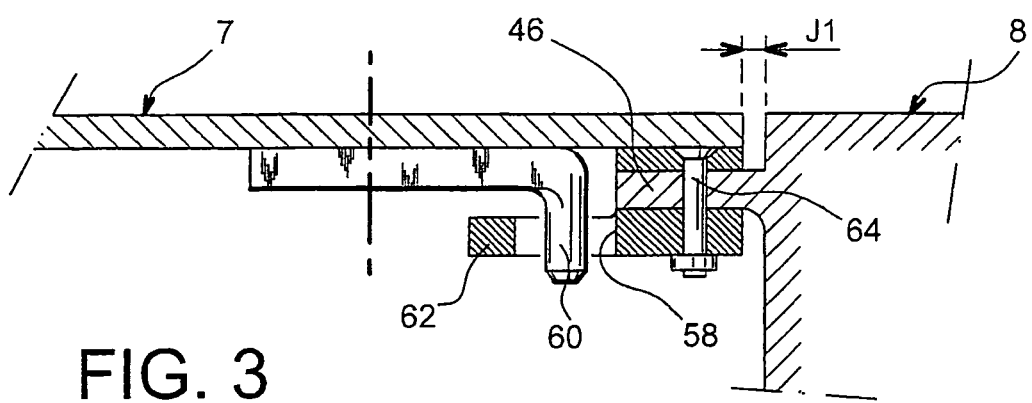
FIG. 3 is a larger scale sectional view of the junction area between one of the fan cowls and the adjacent thrust inverter cowl, according to a second embodiment of the invention.

According to a second embodiment of the invention shown more precisely in FIG. 3, the additional stiffener means include complementary elements 58, 60 formed on the front edges of the thrust inverter cowls 8 and on the back edges of the fan cowls 7.

More precisely, these complementary elements 58 and 60 are arranged so as to be inserted in each other with a small predetermined axial clearance when the fan cowls 6 are closed. The presence of a small axial clearance between these complementary elements is made necessary by fabrication and assembly tolerances, considering the fact that the fan cowls 7 are fixed to the air inlet structure 6 at their front ends. The complementary elements 58 and 60 thus provide a rigid link in the axial direction between the fan cowls 7 and the thrust inverter cowls 8, when the small axial clearance that initially existed between these elements has been corrected.

In the embodiment shown more precisely in FIG. 3, the complementary elements mentioned above include several orifices 58 formed in a part 62 fixed on the front part 46 of each of the thrust inverter cowls 7, by attachment means 64 such as rivets or bolts. These complementary elements also include several studs 60 that are fixed on the back edge of each of the fan cowls 7 by attachment means 62 such as rivets or bolts, so as to penetrate into orifices 58 when the fan cowls are closed, by forming the above mentioned axial clearance between them.

In one variant embodiment not shown, the studs 60 are replaced by a single stud formed on at least part of the circumference of the back edge of each fan cowl and multiple orifices 58 are replaced by a circumferential groove formed on the front edge of each thrust inverter cowl.

As in the first embodiment of the invention described previously with the reference to FIG. 2, this second embodiment keeps the clearance J1 between the thrust inverter cowls 8 and the assembly formed by the air inlet structure 6 and the fan cowls 7 approximately constant. Consequently, the fuel consumption is held at a minimum value despite the pressure differences applied in flight into the air inlet structure 6, due to the aerodynamic air flow.

Obviously, the invention is not limited to the embodiment that has just been described with reference to FIGS. 2 and 3. Thus, for example, the solutions described in these two embodiments could be combined without going outside the scope of the invention.

The invention claimed is:

1. An aircraft engine including a fan casing and a pod, wherein said pod comprises, in sequence along the air flow direction:
   an air inlet structure fixed to the fan casing;
   at least one fan cowl; and
   at least one thrust inverter cowl fixed to the fan casing,
   wherein the pod further comprises:
   a releasable connection mechanism configured to releasably connect a front edge of the fan cowl to a back edge of the air inlet structure; and
   several rigid stiffeners of which one first end is fixed to the air inlet structure close to the releasable connection mechanism, and a second end of each of said rigid stiffeners is fixed to the air inlet structure close to the location at which the air inlet structure is fixed to the fan casing.

2. An aircraft engine according to claim 1, wherein said first end of each of said rigid stiffeners is fixed to the air inlet structure at a same radial distance as the releasable connection mechanism.

3. An aircraft engine according to claim 2, wherein said second end of said rigid stiffeners is fixed to the air inlet structure at the location where the air inlet structure is fixed to the fan casing.

4. An aircraft engine according to claim 3, wherein said first end of each of said rigid stiffeners is fixed to the air inlet structure before and after the releasable connection mechanism releases the fan cowl from said air inlet structure.

5. An aircraft engine according to claim 4, wherein said second end is fixed to the air inlet structure before and after the releasable connection mechanism releases the fan cowl from said air inlet structure.

6. An aircraft engine according to claim 1, wherein said releasable connection mechanism comprises blades on said front edge of the fan cowl, and wherein said blades fit into orifices provided on the air inlet structure.

7. An aircraft engine according to claim 1, wherein said releasable connection mechanism comprises a circumferential stud on said front edge of the fan cowl, and wherein said stud fits into a circumferential groove provided on the air inlet structure.

8. An aircraft engine according to claim 1, wherein said rigid stiffeners are arranged so as to be located on a same plane approximately perpendicular to a longitudinal axis of said aircraft engine.

9. An aircraft engine according to claim 1, wherein the second end of each of said rigid stiffeners is offset backwards and inwards relative to said first end.

10. An aircraft engine including a fan casing and a pod, wherein said pod comprises, in sequence along the air flow direction:
an air inlet structure fixed to the fan casing, wherein the air inlet structure comprises an outer enclosure, an inner enclosure, and first stiffeners connecting the outer enclosure and the inner enclosure to each other;
at least one fan cowl; and
at least one thrust inverter cowl fixed to the fan casing, wherein the pod further comprises:
a releasable connection mechanism configured to releasably connect a front edge of the fan cowl to a back edge of the air inlet structure; and
second rigid stiffeners, of which a first end is fixed to the first stiffeners, at the mid-point along the first stiffeners' length, and a second end of said second rigid stiffeners is fixed to the air inlet structure close to the location at which the air inlet structure is fixed to the fan casing.

11. An aircraft engine according to claim 10, wherein said second end of said second rigid stiffeners is fixed to the air inlet structure at the location where the air inlet structure is fixed to the fan casing.

12. An aircraft engine according to claim 11, wherein said first end of each of said second rigid stiffeners is fixed to the air inlet structure before and after the releasable connection mechanism releases the fan cowl from said air inlet structure.

13. An aircraft engine according to claim 12, wherein said second end is fixed to the air inlet structure before and after the releasable connection mechanism releases the fan cowl from said air inlet structure.

14. An aircraft engine according to claim 10, wherein said releasable connection mechanism comprises blades on said front edge of the fan cowl, and wherein said blades fit into orifices provided on the air inlet structure.

15. An aircraft engine according to claim 10, wherein said releasable connection mechanism comprises a circumferential stud on said front edge of the fan cowl, and wherein said stud fits into a circumferential groove provided on the air inlet structure.

16. An aircraft engine including a fan casing and a pod, wherein said pod comprises, in sequence along the air flow direction:
an air inlet structure fixed to the fan casing;
at least one fan cowl; and
at least one thrust inverter cowl fixed to the fan casing, wherein the pod further comprises:
a releasable connection mechanism configured to releasably connect a front edge of the fan cowl to a back edge of the air inlet structure; and
complementary elements formed on a front edge of the thrust inverter cowl and on a back edge of the fan cowl, said complementary elements being arranged so as to be inserted in each other with a small predetermined axial clearance when the releasable connection mechanism connects the fan cowl to said air inlet structure, to enable transmission of axial forces after compensation of said clearance.

17. An aircraft engine according to claim 16, wherein the complementary elements comprise several orifices formed on the front edge of the thrust inverter cowl and several studs formed on the back edge of the fan cowl, so as to penetrate into said orifices when the releasable connection mechanism connects the fan cowl to said air inlet structure, the orifices and the studs being distributed around the periphery of the engine.

18. An aircraft engine according to claim 16, wherein the complementary elements comprise a circumferential groove formed on the front edge of the thrust inverter cowl and a stud formed on at least part of the circumference of the back edge of the fan cowl, so as to penetrate into said circumferential groove when the releasable connection mechanism connects the fan cowl to said air inlet structure.

* * * * *